United States Patent Office 3,182,093
Patented May 4, 1965

3,182,093
PREPARATION OF 1,5-CYCLODODECADIENE
William E. Wellman, Edison, N.J., assignor to Esso Research and Engineering Company, a corporation of Delaware
No Drawing. Filed Oct. 2, 1961, Ser. No. 141,966
3 Claims. (Cl. 260—667)

The present invention relates to the preparation of 1,5-cyclododecadiene (CDD). More particularly it concerns the hydrogenation of 1,5,9-cyclododecatriene (CDT) to 1,5-cyclododecadiene.

Heretofore cyclic polyolefins have been hydrogenated to the corresponding monoolefins in the liquid phase using secondary alcohols as hydrogen donors. This method is satisfactory where the desired product is a monoolefin. However, the diolefin is also a very useful product. For instance, it can be oxidized to make an unsaturated aliphatic dibasic acid having the same number of carbon atoms. Such acids have utility in the preparation of nylon-type polymers and ester plasticizers. They are also useful as intermediates in the synthesis of lower molecular weight dibasic acids via oxidative cleavage at the double bond.

It has now been discovered that cyclododecadiene can be selectively made by the liquid phase, catalytic hydrogenation of cyclododecatriene in the presence of a polyol, especially 2,3-butanediol. Some of the polyols have two functions, namely, that of a hydrogen donor and that of a modifier which substantially increases the selectivity of the reaction to form the diene. In other instances the polyhydric compound serves only as a modifier and is employed in combination with the well known hydrogen donors commonly used in such reactions, such as sec. butyl alcohol and isopropyl alcohol.

Prior to the present invention the maximum yields of diene obtained by other hydrogenation methods were about 45 to 55%. By means of the present invention it is possible to increase the yield of CDD from about 30 to 45%. It is believed that this improvement is the result of an adsorption phenomenon, i.e., that the polyol is adsorbed on the surface of the catalyst in preference to the diene and thereby prevents the further hydrogenation of the diene to the monoolefin.

Among the polyols that can be used in the process are aliphatic and cyclic organic compounds having 2, 3 or more hydroxyl groups and 2 to 10 carbon atoms, such as 2,3-butanediol, 2,4-pentanediol, ethylene glycol, propylene glycol, 1,2-cyclobutanediol, 1,2-cyclohexanediol, 1,2-cyclohexanediol, 2,2-dimethyl-1,3-butanediol, 1,2,6-hexanetriol and 2,4,6-heptanetriol. The preferred polyols are saturated $C_3$ to $C_6$ aliphatic glycols consisting of carbon, hydrogen and oxygen in which at least one of the hydroxyl groups is attached to a secondary carbon atom. Of the aforementioned compounds, 2,3-butanediol is especially preferred because of its outstanding effect on the selectivity of the reaction.

The most effective hydrogenation catalyst is finely divided Raney nickel that is essentially water-free. Water interferes with the reaction and therefore it is best to wash the catalyst with a secondary alcohol, e.g., sec. butanol, prior to using it. Other high surface area solid catalysts, such as reduced nickel and platinum, can be used but the improvement is substantially less.

The 1,5,9-cyclododecatriene feed can be prepared by trimerizing butadiene with an alkyl metal catalyst (Angewandte Chemie, volume 69, page 397, 1957). Although there are four possible isomers of the substance, only two have been obtained to date, namely, the cis, trans, trans, and the all trans. However, any of the isomers or mixtures thereof can be used in the process.

In one embodiment of the present invention in which the modifier is also a hydrogen donor, CDT is mixed with approximately an equimolar quantity of one of the above polyols in the presence of about 1 to 100 wt. percent of a hydrogenation catalyst, based on the CDT, and the resulting mixture is maintained at approximately atmospheric pressure and a temperature of 0° to 200° C., preferably 30° to 150° C., until substantially all of the CDT is converted into CDD.

In some instances the CDT is immiscible in the polyol and it is necessary to employ a mutual solvent in order to get a single phase reaction mixture. While hydrocarbon liquids can be used, lower molecular weight ketones, ethers and secondary alcohols are the preferred solvents. Examples of suitable inert $C_3$ to $C_6$ oxygenated organic solvents are acetone, methylethylketone, diethyl ether, cyclohexanone, tetrahydrofuran and sec. butyl alcohol. The last named compound can also serve as a source of hydrogen in the reaction. The amount of solvent used depends mainly on the properties of the solvent. In most cases, the solvent concentration is about 50 to 500 wt. percent of the CDT reactant. The solvent should have a boiling point that is at least 10° C. above or below the diene product if the diene is to be recovered by distillation.

Superatmospheric pressure, e.g., up to 50 p.s.i.g., can be used to keep the more volatile solvents in the liquid phase at the higher reaction temperatures. Alternatively, solvents, e.g., n-diamyl ketone, having boiling points that are substantially above the diene product can be used at the more elevated temperatures in lieu of pressure.

Because of the deleterious effect of water, it is advisable to keep the atmosphere above the reaction liquid free of water vapor. Dry air is a satisfactory atmosphere for the reaction. In addition to air, inert gases, such as helium, nitrogen and methane, can also be employed.

The molar ratio of polyol to CDT is usually about 0.8 to 4:1. Larger and smaller ratios can be employed, but generally with less success. It is generally best to use a molar ratio in the range of 1 to 1.2:1, especially at the intermediate reaction temperatures, i.e., 30 to 100° C.

The hydrogenation reaction is complete within a relatively short time at the preferred temperatures. For instance, at temperatures of 50 to 60° C., the CDT is completely converted in less than an hour. Longer periods of time, e.g., up to 10 hours, are needed at temperatures below room temperature. Under more severe conditions, the reaction takes place in a few seconds.

As mentioned above, a conventional hydrogen donor can be used with the polyol in the hydrogenation of CDT. While hydrocarbons, such as tetralin, can be used for this purpose, it is preferred to utilize saturated secondary monohydric alcohols containing 3 to 12 carbon atoms. Examples of aliphatic and cyclic alcohols that can be employed are sec. butyl alcohol, isopropyl alcohol, cyclohexanol and cyclododecanol. If the polyol functions only as a modifier, at least about one mol of the donor per mol of CDT should be used. In most instances the molar ratio of donor to CDT should be between about 1 and 2:1.

Upon completion of the liquid phase hydrogenation of CDT, the diene product is recovered by separating the liquid from the solid catalyst, e.g., by filtration, and fractionally distilling the catalyst-free liquid to remove the dehydrogenated polyol and anl solvent or diluent that was utilized to facilitate contacting the reactants. Where the solvent is low boiling, the diene product will be in the residual liquid. Further purification of the diene is not always necessary because of the high selectivity of the reaction. However, if desired, high purity product can be obtained by conventional methods, such as the formation of derivatives having different physical characteristics.

The dehydrogenated polyol and/or the conventional hydrogen donor can be regenerated by well known hydrogenation techniques and recycled to the reaction zone. For instance, in the case of 2,3-butanediol, the keto-alcohol formed as a result of the liquid phase hydrogenation reaction is regenerated by passing it through a fixed bed of reduced nickel on alumina at temperatures of 150 to 200° C. under hydrogen pressures of 10 to 50 atmospheres.

The product can be oxidized by known methods to form 4-dodecenedioic acid which can be used to make ester plasticizers, e.g., with higher oxo alcohols, or it can be selectively hydrogenated to make the corresponding saturated dibasic acid. The diene itself is a useful intermediate in the synthesis of many useful compounds, including the corresponding monoolefin.

The following examples are provided to give a better understanding of the invention.

*Example 1*

CDT (20 g.) is admixed with 11.3 g. of 2,3-butanediol and 90 cc. of acetone in the presence of 9 g. of finely divided Raney nickel (W–5) catalyst in a three-necked glass flask fitted with a cold water condenser. The reaction mixture is stirred under a nitrogen atmosphere and heated to 50° C. After being at the aforementioned temperature for about 45 minutes the liquid reaction mixture is analyzed and it is found that the hydrocarbon portion of the liquid consists of 88.9% of 1,5-cyclododecadiene, 11.1% cyclododecene (CDE) and a trace of 1,5,9-cyclododecatriene.

*Example 2*

Example 1 is repeated with the exception that the reaction mixture is stirred for 30 minutes. The liquid product consists of 90.9% CDD, 9.1% CDE and a trace of CDT.

*Example 3*

The previous example is repeated with the exception that the reaction is allowed to continue for 75 minutes. The hydrocarbon portion of the liquid reaction mixture at the end of this time is substantially the same as that found when the reaction time was only 45 minutes.

When secondary butanol (120 cc.) alone is used to hydrogenate CDT (20 g.) in the presence of 9 g. of Raney nickel, the maximum concentration of CDE in the hydrocarbon part of the liquid reaction mixture is 54%.

*Example 4*

The following run shows the effect of using a separate hydrogen donor in addition to the polyol. CDT (20 g.) is admixed with 92 cc. of secondary butanol and 45 g. of 2,3-butanediol in the presence of 6 g. of Raney nickel (W–5) catalyst. The resulting mixture is stirred and heated to 42° C. under an atmosphere of dry nitrogen for about 130 minutes. An analysis of the liquid in the mixture shows that the hydrocarbon portion consists of 80.4% of CDD and 18.8% of cyclododecene. The reaction mixture also contains about 0.8 cyclododecane. Thus, while the polyol can be used in combination with another hydrogen donor to some advantage, the selectivity is generally less than that obtained with the polyol alone.

*Example 5*

Example 1 is repeated using 2,4-pentanediol in place of 2,3-butanediol.

*Example 6*

Example 1 is repeated using 1,2,6-hexanetriol in place of 2,3-butanediol.

*Example 7*

Example 1 is repeated using a reduced nickel catalyst supported on kieselguhr instead of Raney nickel at a higher reaction temperature, i.e., 100 to 150° C.

*Example 8*

Example 1 is repeated using a reduced platinum catalyst instead of Raney nickel.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. A process for selectively hydrogenating 1,5,9-cyclododecatriene to 1,5-cyclododecadiene which comprises mixing said cyclododecatriene and 2,3-butanediol in a molar ratio of 0.8 to 4:1 in the presence of Raney nickel catalyst and a low molecular weight mutual solvent selected from the group consisting of ketones, ethers and secondary alcohols at about 30 to 100° C. for up to about an hour and recovering the cyclododecadiene formed.

2. A process for selectively hydrogenating 1,5,9-cyclododecatriene to 1,5-cyclododecadiene which comprises contacting said cyclododecatriene and a polyol containing 2 to 10 carbon atoms in the presence of a $C_3$ to $C_{12}$ secondary monohydric alcohol and a hydrogen catalyst selected from the group consisting of Raney nickel, reduced nickel and platinum at temperatures up to 200° C. and recovering the cyclododecadiene formed.

3. A process according to claim 2 in which said secondary monohydric alcohol is a secondary butanol.

References Cited by the Examiner

UNITED STATES PATENTS

| 2,700,021 | 1/55 | Elofson | 260—666 XR |
| 3,022,359 | 2/62 | Wiese et al. | 260—667 |

FOREIGN PATENTS

| 448,350 | 5/48 | Canada. |
| 1,063,780 | 12/53 | France. |

ALPHONSO D. SULLIVAN, *Primary Examiner.*

JOSEPH R. LIBERMAN, *Examiner.*